United States Patent [19]

Rannenberg

[11] 4,374,469
[45] Feb. 22, 1983

[54] VARIABLE CAPACITY AIR CYCLE REFRIGERATION SYSTEM

[75] Inventor: George C. Rannenberg, Canton, Conn.

[73] Assignee: United Technologies Corporation, Hartford, Conn.

[21] Appl. No.: 219,612

[22] Filed: Dec. 24, 1980

[51] Int. Cl.³ .............................................. F25D 9/00
[52] U.S. Cl. ...................................... 62/402; 62/172; 62/196 C
[58] Field of Search ................... 62/86, 87, 401, 402, 62/196 R, 196 C, 172

[56] References Cited

U.S. PATENT DOCUMENTS

| | | | |
|---|---|---|---|
| 2,637,984 | 5/1953 | Bloomberg | 62/123 |
| 2,767,561 | 10/1956 | Seeger | 62/87 |
| 2,851,863 | 9/1958 | Theed | 62/172 |
| 2,856,758 | 10/1958 | Eggleston et al. | 62/88 |
| 2,940,280 | 6/1960 | Reaser | 62/402 |
| 2,958,202 | 11/1960 | Green | 62/5 |
| 3,026,681 | 3/1962 | Green | 62/5 |
| 3,080,728 | 3/1963 | Groves et al. | 62/172 |
| 3,177,676 | 4/1965 | Abrahams | 62/172 |
| 3,428,242 | 2/1969 | Rannenberg | 230/116 |
| 3,511,161 | 5/1970 | Schindelman | 62/401 |
| 3,523,428 | 8/1970 | Nagyszalanczy | 62/402 |
| 3,563,669 | 2/1971 | Hockert et al. | 415/115 |
| 3,588,269 | 6/1971 | Wall, Jr. | 415/161 |
| 3,696,637 | 10/1972 | Ness et al. | 62/402 |
| 4,013,377 | 3/1977 | Amos | 415/161 |
| 4,021,215 | 5/1977 | Rosenbush et al. | 62/402 |

*Primary Examiner*—Ronald C. Capossela
*Attorney, Agent, or Firm*—John Swiatocha

[57] ABSTRACT

An air cycle refrigeration system having an enhanced flow capacity range includes an expansive turbine fed through a primary inlet nozzle by discharge air from the system's compressor and through a secondary inlet nozzle by system supply air. Flows through the turbine inlet nozzles are controlled such that maximum flow through the primary inlet nozzle is achieved before flow through the secondary nozzle is instituted.

4 Claims, 1 Drawing Figure

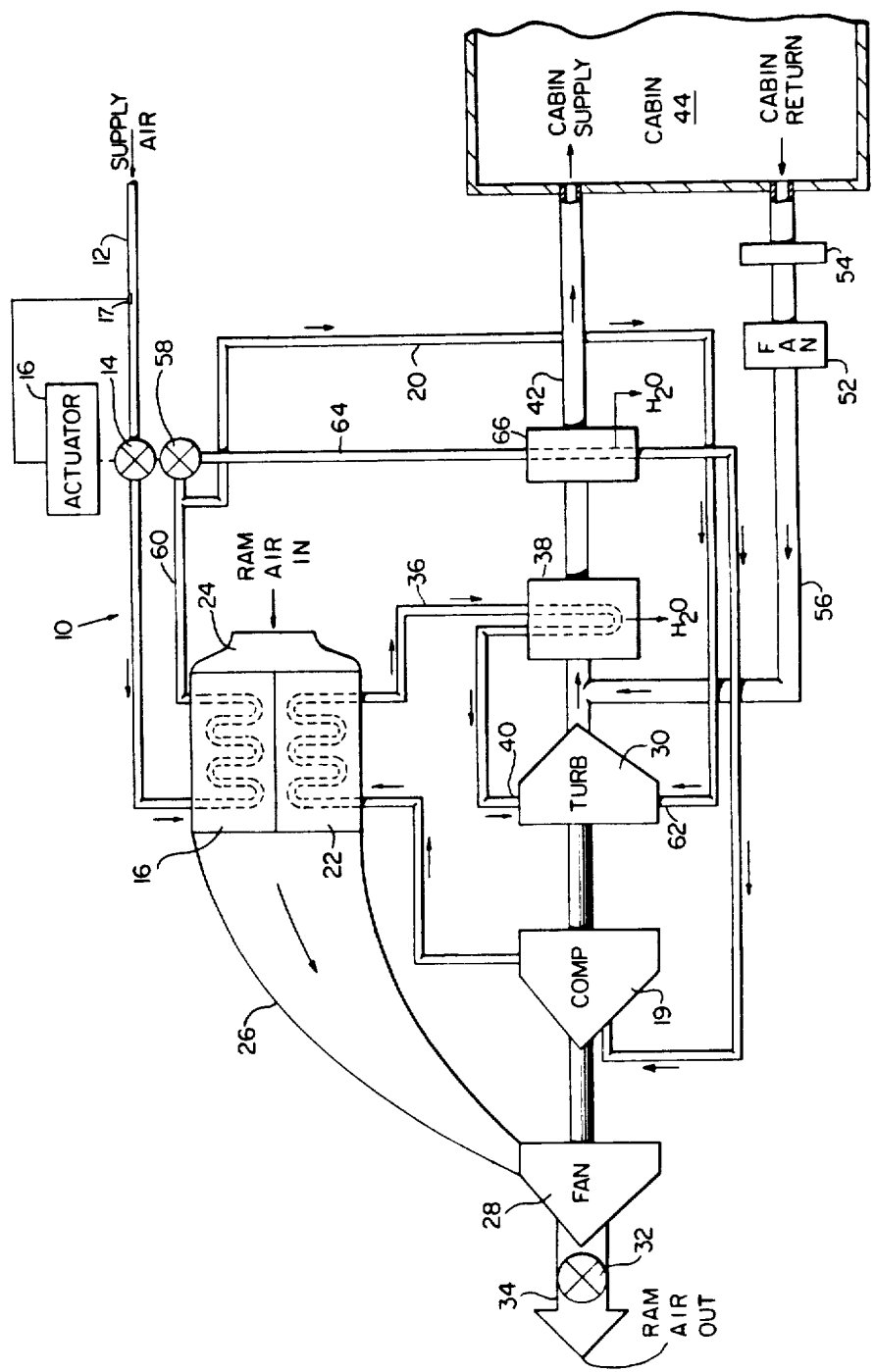

VARIABLE CAPACITY AIR CYCLE REFRIGERATION SYSTEM

TECHNICAL FIELD

This invention relates to a turbine driven air cycle refrigeration system for providing pressurized cooling air to aircraft cabins or other loads.

BACKGROUND ART

In the typical air cycle refrigeration system employed to pressurize and cool aircraft cabins or similar loads, inlet or supply air obtained from a gas turbine engine compressor is pressurized in the refrigeration system compressor, cooled by ambient air in a heat exchanger and then fed to the system's turbine, work done on the turbine by the compressed air causing a cooling of the air which is then discharged to the load. The turbine is mechanically connected to the compressor such that work done on the turbine by the compressed air aids in driving the compressor rotor.

It is understood that the operation of a gas turbine engine compressor varies significantly with varying modes of engine operation such as during the flight of an aircraft powered by the engine. By way of example, in a cruise mode of operation, where considerably thrust is required, the engine's compressor passes much greater flows of air therethrough than, for example, in a decent mode of operation, where as little thrust as possible is desired. Accordingly, the flow of bleed air available from the engine's compressor for the operation of the aircraft's refrigeration system also varies significantly throughout the various modes of aircraft operation. To maintain a constand environment in the aircraft cabin for minimization of passenger discomfort, it is required that the air cycle refrigeration system accommodate such variations in bleed air supply thereto by adjustments in the flow capacity of the refrigeration system. Of course, such adjustments to the system's capacity should not be at the expense of the ability of the system to adequately cool and pressurize the load. Although this discussion has dealt with gas turbine engine applications in aircraft, it will be understood that such engine compressor bleed pressure variations due to variations in engine operation from idle to full power are exhibited in any of various other engine applications.

Various schemes have been proposed for the purpose of achieving wide ranges of system flow capacity of the refrigeration system to accommodate expected variations in supply pressure. In one such scheme, the system's compressor discharges to the turbine through a variable area turbine inlet nozzle. The nozzle is opened for increased flow capacity when supply pressure is low and closed to reduce the system's flow capacity when supply pressure is high. However, it has been found that opening the turbine inlet nozzle has only a slight effect on the compressor flow capacity thereby doing little to enhance air flow through the system. Furthermore, increasing the turbine nozzle area reduces the pressure rise associated with the compressor, thereby reducing the overall efficiency of the system. It has been found that such prior art systems utilizing a variable area turbine inlet nozzle are limited to about 25 percent variations in system flow capacity.

An alternate scheme for providing sufficient flow range involves provision of a variable area compressor discharge nozzle in combination with a variable area turbine inlet nozzle so that an adjustment in one of the nozzle areas to modulate the flow capacity of the system may be accompanied by an adjustment in the other nozzle area thereby matching the flow characteristics of the compressor with those of the turbine. However, a system of this type employing both variable turbine and compressor nozzles may be overly complex and costly for its intended application.

Still another prior art scheme to provide varying flow capacity employs the selective addition of system inlet air to the turbine discharge flow. While this flow addition to the turbine discharge may be effective for modulating flow (cabin pressurization), it achieves no additional cooling and, therefore, may be unsuitable under conditions of low engine bleed conditions when increased cooling capacity is required.

A last prior art arrangement for varying the flow capacity of an air cycle refrigeration machine includes the provision of a second air cycle system operated as a turbo-supercharger to increase the supply pressure into (and therefore, the flow through) the primary system's turbine for enhanced cooling capability. However, such an additional air cycle system or turbo-supercharger would of course, contribute substantially to the cost and complexity of the system.

DISCLOSURE OF INVENTION

It is a principal object of the present invention to provide an improved air cycle refrigeration system of enhanced flow and cooling range.

It is another object of the present invention to provide such an improved air cycle refrigeration system characterized by an economy of structure and cost.

In accordance with the present invention, an air cycle refrigeration system is provided wherein air is fed to an expansion turbine through a pair of turbine inlet nozzles, a primary nozzle receiving compressed air from the refrigeration system's compressor, and a secondary nozzle being provided with system inlet air such as bleed air from a gas turbine engine compressor. The air flow to the turbine from the refrigeration system's compressor is controlled by a first flow controller. The inlet air flow to the turbine is controlled by a second controller. These two flow controllers are sequentially operated, in the preferred embodiment, from a single actuator, such that the first flow controller is adjusted to provide maximum possible supply flow to the system prior to the opening of the second flow controller.

BRIEF DESCRIPTION OF THE DRAWING

The sole FIGURE is a schematic diagram of a preferred embodiment of the air cycle refrigeration system of the present invention.

BEST MODE FOR CARRYING OUT THE INVENTION

Referring to the drawing, the air cycle refrigeration system of the present invention is shown generally at 10. The system is supplied with air such as bleed air from the compressor section of a gas turbine engine through inlet line 12, the flow through line 12 being controlled by a first valve or flow controller 14 operated by actuator 16 in response to the output of a suitable flow sensor 17 disposed in inlet line 12. Flow controller 14 may be of any known type such as a flapper or butterfly valve. Actuator 16 may be of any variety known in the art such as any known fluid, mechanical or electrical actuators. The supply air is channeled through a primary heat exchanger 18 where the air is cooled by a flow of ambient air such as engine ram air therethrough. The supply air flow is then channeled through conduit 60 and split, a portion thereof being channeled through line 20, to the refrigeration system's compressor 19 where the air is compressed with a resultant heating thereof. The compressed air is then cooled in a secondary heat exchanger 22 by ambient air such as the engine ram air described hereinabove. As shown, primary and secondary heat exchangers 16 and 22 may be housed in a single unit, ram air being supplied to that unit through inlet 24. Upon discharge from heat exchangers 16 and 22, the ram air is channeled through duct 26 at the termination of which a fan 28 may be provided to enhance and maintain the continuity of air flow through primary and secondary heat exchangers, the fan being driven with compressor 19 by the system's expansion turbine 30. A flow control valve 32 disposed in fan outlet duct 34 may be employed to control the flow of cooling air through heat exchangers 18 and 22.

If desired, for purposes of removing water vapor from the compressor discharge air, that air, after exiting secondary heat exchanger 22, may be fed through line 36 to condensor 38 from which the air is fed to primary inlet 40 of turbine 30. This air, in the usual manner, does work on the turbine turning the rotor thereof, thereby causing an expansion and cooling of the air which is then discharged from the turbine through condensor 38 which cools and dries the turbine inlet air. From the condensor, the turbine discharge air is channeled through conduit 42 to the load, in this case the cabin 44 of an aircraft. Air from the load may be recirculated by fan 52 to the turbine outlet for purposes of melting ice in the cooled turbine discharge air. Fan 52 draws air from the load through a filter 54 and conduit 56 which connects cabin 44 with the turbine discharge.

As set forth hereinabove, the cooling and pressurizing capability of system 10 depends upon the flow of primary air through the system. When the supply diminishes, as under conditions of descent of an aircraft in which the system is employed, cooling output of the system diminishes unless the capacity of the system is adjusted to accommodate greater amounts of available supply air. In accordance with the present invention, this adjustment is effected by modulating a second flow controller or valve 58 disposed in line 60 which connects the output of primary heat exchanger 16 with secondary turbine inlet nozzle 62, through line 64. In operation, as the cooling capacity of the air cycle refrigeration system is required to be increased, first flow controller 14, is continuously opened to increase the supply of primary air to the refrigeration system while second flow controller 58 remains closed whereby none of the supply air bypasses compressor 18. When first flow controller 14 is opened to its limit and the capacity of the system is required to be increased further, second flow controller 58 is gradually opened, thereby channeling a portion of the supply air cooled in primary heat exchanger 16 to second turbine inlet nozzle 62, thereby increasing the amount of work done on the turbine and thus, increasing the capacity of the system. A second condensor 66 may be disposed in line 60 for drying the air channeled to the secondary turbine inlet nozzle. As shown, cooling for condensor 66 may be provided by the turbine discharge air.

As shown, first flow control valve 14 and second flow control valve 58, may be operated by a single actuator such as acutator 16 noted hereinabove. From the foregoing description, it is noted that actuator 16 first opens first flow controller 14 and then second flow controller 58 as the capacity of the refrigeration system is increased. A decrease in the refrigeration system's capacity requires that actuator 16 first close second flow controller 58 and then, when valve 58 is completely closed, gradually close first flow control valve 14. Such sequential operation of a plurality of valves by a single actuator is well known in the art, being accomplished by any suitable mechanism such as a lost motion mechanism connecting the movable elements of valves 14 and 58.

It is seen then that the air cycle refrigeration system of the present invention is capable of a wide range of flow capacities without the implementation of variable geometry turbine and compressor nozzles. When supply flow control valve 14 is opened to its limit, and the capacity of the system must be further increased, supply air is passed directly to turbine 30 increasing the work done on the turbine and increasing the system's cooling and pressurization capability, without reducing the operating efficiency of compressor 18. The enhanced capacity range of the air cycle refrigeration system of the present invention is achieved with an economy of structure and cost, requiring only the addition of simple throttle valves and conduits rather than complex and costly variable area nozzles and the like.

Although this invention has been shown and described with respect to a detailed embodiment thereof, it will be understood that various modifications in form and detail will suggest themselves to those skilled in the art, and it is intended by the appended claims to cover such modifications as come within the true spirit and scope of this invention.

I claim:

1. An air cycle refrigeration system for supplying conditioned air to an enclosure said system comprising a compressor for increasing the pressure of supply airflow thereto, discharge airflow from said compressor being fed to a turbine through a primary nozzle thereof, said compressor discharge airflow driving said turbine and being expanded, and cooled thereby and discharged therefrom, means for delivering said turbine discharge air to said enclosure, said turbine and compressor being mechanically interconnected whereby said turbine provides a measure of input power for driving said compressor, said air cycle refrigeration system being characterized by means channeling an additional portion of said supply air to said turbine through a second nozzle thereof, thereby bypassing said compressor, and means for regulating the flow of said compressor bypass airflow to said turbine, in response to the amount of available supply airflow, said compressor bypass air, with said compressor discharge air, being expanded by said turbine for enhancing the flow capacity and output of said system without adversely affecting compressor efficiency.

2. The air cycle refrigeration system of claim 1 and further including means for regulating the total flow of supply air to said system.

3. The air cycle refrigeration system of claim 1 wherein said total supply airflow regulating means and said compressor bypass airflow regulating means are sequentially operated by a single actuator.

4. The air cycle refrigeration system of claim 2 wherein said total supply air flow regulating means is actuated to effect maximum total supply airflow to said refrigeration system prior to actuation of said compressor bypass air regulating means to effect any compressor bypass airflow.

* * * * *